(12) United States Patent  
Smith

(10) Patent No.: US 9,862,328 B2  
(45) Date of Patent: Jan. 9, 2018

(54) FISHING ROD RACK

(71) Applicant: Wayne Tracy Smith, Auckland (NZ)

(72) Inventor: Wayne Tracy Smith, Auckland (NZ)

( * ) Notice: Subject to any disclaimer, the term of this patent is extended or adjusted under 35 U.S.C. 154(b) by 229 days.

(21) Appl. No.: 14/922,092

(22) Filed: Oct. 23, 2015

(65) Prior Publication Data

US 2017/0113622 A1    Apr. 27, 2017

(51) Int. Cl.
*B60R 7/08* (2006.01)
*A01K 99/00* (2006.01)
*F16G 11/10* (2006.01)

(52) U.S. Cl.
CPC ............... *B60R 7/08* (2013.01); *A01K 99/00* (2013.01); *F16G 11/103* (2013.01)

(58) Field of Classification Search
CPC .... B60R 7/04; B60R 7/08; B60R 7/12; B60R 7/14; B60R 2011/0029
USPC .......... 224/922, 567–568, 572, 311; 43/21.2; 211/70.8, 119.1; D3/147, 148
See application file for complete search history.

(56) References Cited

U.S. PATENT DOCUMENTS

| | | | | |
|---|---|---|---|---|
| 479,509 | A | * 7/1892 | Heaphy, Jr. | ............. F16G 11/10 |
| | | | | 24/129 A |
| 2,721,680 | A | 10/1955 | Steckman | |
| 2,907,506 | A | * 10/1959 | Sammons | ................. B60R 9/08 |
| | | | | 224/317 |
| 3,155,299 | A | * 11/1964 | Horne | ..................... B60R 5/006 |
| | | | | 211/70.8 |
| 4,881,674 | A | 11/1989 | Medianik | |
| D314,683 | S | * 2/1991 | Scanland | ........................ D6/552 |
| 5,544,797 | A | * 8/1996 | Silva | ........................ B60R 7/08 |
| | | | | 211/70.8 |
| 5,632,427 | A | * 5/1997 | Gattuso | .................. A01K 97/10 |
| | | | | 211/70.8 |
| 5,791,022 | A | * 8/1998 | Bohman | ............... F16G 11/103 |
| | | | | 24/115 R |
| 6,267,425 | B1 | 7/2001 | Dorsey | |
| 6,450,982 | B1 | 9/2002 | Peterson | |
| 6,910,592 | B1 | 6/2005 | Lindenmeyer | |
| 8,746,469 | B1 | 6/2014 | De La Torre | |

(Continued)

FOREIGN PATENT DOCUMENTS

GB    2451492    2/2009

*Primary Examiner* — Justin Larson
*Assistant Examiner* — Phillip Schmidt

(57) ABSTRACT

The present invention relates generally to a fishing rod carrier used by persons for transporting fishing rods inside a vehicle. Particularly to an improved fishing rod rack for vehicles that is mountable on the inside of the top of the form of sports utility vehicles, station wagons and hatchbacks. The rod rack retains a plurality of fishing rods securely and protected from damage while keeping the rods highly accessible. This rod rack is easily installed and removed and made of flexible materials so it can be rolled up and stored when not in use. The apparatus is mostly comprised of two carrier members, spaced apart at a desired distances and positioned, substantially parallel to each other across with width of a vehicles cab. The carrier holds fishing rods having a handle at one end and a rod tip at the opposite end. Fishing rods are secured where the handle end of each fishing rod is held by a portion of shock cord on one carrier member and where the tip end of the fishing rods are held by a corresponding portion of shock cord in the opposite carrier member.

13 Claims, 7 Drawing Sheets

(56) References Cited

U.S. PATENT DOCUMENTS

2001/0050298 A1* 12/2001 Larsen .................... B60R 7/04
                                                              224/311
2012/0234505 A1    9/2012 Hartwig

* cited by examiner

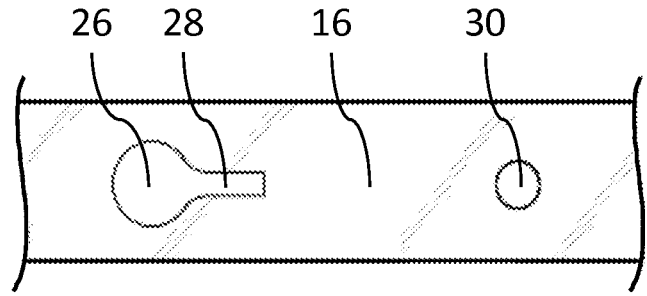
*Fig. 5*
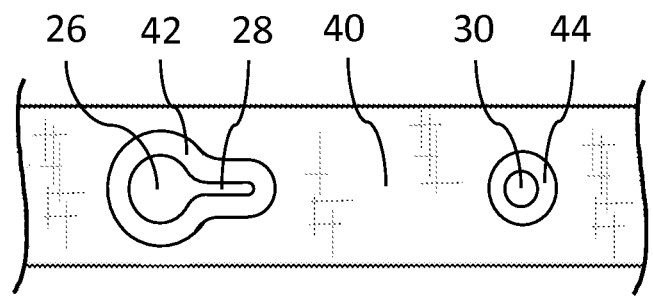
*Fig. 6*
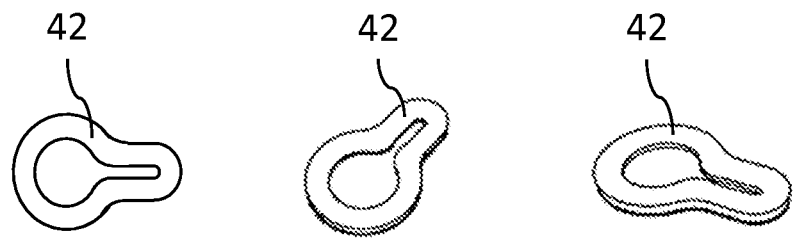
*Fig. 7A*  *Fig. 7B*  *Fig. 7C*

FISHING ROD RACK

BACKGROUND OF THE INVENTION

Field of Invention

The present invention relates generally to a fishing rod carrier used by persons for transporting fishing rods inside a vehicle.

Particularly to an improved fishing rod rack for vehicles that is mountable on the inside of the top of the form of sports utility vehicles, station wagons and hatchbacks. The rod rack retains a plurality of fishing rods securely and protected from damage while keeping the rods highly accessible. This rod rack is easily installed and removed; it's designed primarily for occasional use. It's generally made of flexible materials so it can be rolled up and stored when not in use.

This rod rack is adaptable, storable and simple to use. Fishing rods are held securely, protected from damage and are easily accessible.

Background of the Invention

Transporting assembled fishing rods when travelling by SUV's or station wagons has always been difficult. Because fishing rods are generally long, it makes them awkward and cumbersome to carry inside vehicles. Rods are subject to breakage and they get in the way of passengers and other gear.

One common solution is to carry fishing rods attached to outside of the car using various forms of roof and hood/bonnet mounted racks, this subjects the rods to the wind, rain, dust, and even theft.

Most people fish occasionally and need to use their vehicles for everyday use, so an easy to install and removable rod rack that can be used for weekends or a short trip is desirable. The most common interior rod racks are non-removable and permanently affixed. And transporting a fishing rod inside a vehicle that is assembled and fully rigged for fishing, without a proper carrying system, leaves much to be desired as they get in the way of passengers and are easily damaged.

Current occasional use rod racks lack versatile mounting solutions as they are attached to the vehicle using existing fixed garment hangers or grab bars, restricting mounting positions within the vehicle. Many lack a simple and easy way to fix rods onto the device. Most have fixed loops making it difficult or impossible to hold full-length fishing rods with fishing reels attached. This is because the handle end of the rod and reel have to be brought forward of the rear carrier in order for the rod to be placed in a loop, rods are restricted from going forward by the windshield, it's often an impossible task within the restricted environment of a modern vehicle interior. Fixed loops are also non-adjustable and non-tensionable, which doesn't allow rods to be held securely, especially when rods are too long to be carried in one piece and have to be carried in two or three sections. With fixed loops multiple rod section can't be properly secured, they'll rattle and can become damaged. Rod racks that are made of ridged materials can be difficult to install, take up lots of room when not in use, and are generally expensive.

The object of the present invention is to provide a fishing rod support, which overcomes the disadvantages referred to above.

Prior Art

There is prior art that relates directly vehicle interior fishing rod racks and many can be found online in fishing tackle stores. Some are similar in construction to the present invention; of these most are permanently mounted, ridged constructed and overly complicated; others are flexible "strap-style" type rod racks; of these most lack adaptable mounting options and/or an optimal system of securing rods. Even though these products and art have something in common with the present invention, all will be shown to be significantly different in design and construction.

All known prior art lacks at least one of the following claims of the present invention. The present invention has been adapted to a fishing rod carrier that holds multiple rods which is mountable on the inside of the top of the form of a vehicle cab interior. The carrier is made of two carrier members which are spaced apart at a desired distances and positioned substantially parallel to each other across with width of a vehicles cab. The carrier holds fishing rods having a handle at one end and a rod tip at the opposite end. Fishing rods are secured where the handle end of each fishing rod is held by a portion of shock cord on one carrier member and where the tip end of the fishing rods are held by a corresponding portion of shock cord in the opposite carrier member. Where in: 1) Each carrier member having a base member comprised of a flat piece of elongated material(s) having two faces and first and second ends; the base members including alterating pairs of one round shaped and one keyhole shaped cutouts which are located in the face of the base member, these cutouts are indexed along the longitudinal center line of the base members; 2) the base members comprises a means of retaining fishing rods wherein a portion of fishing rod is secured against one face of the base member by adjustable and tensionable individual portions of flexible elastomeric elongated cord (shock cord), having first and second ends and having one piece of shock cord per pair of cutouts; wherein each portion of shock cord is affixed at it's first end through one of the holes in the base member and where it's second end is releasably affixed to the base member by being passed through the keyhole shaped cutout where it is drawn into a slot within the cutout, where it is held in a desired position by means of compression upon the shock cord from opposing sides of the cutout; the shock cord is tensioned around the fishing rod to hold it securely. 3) the base members including two flexible elongated straps, in the form of webbing, used to attach the carriers to the vehicle, one coupled at it's first end to the first end of the base member and one coupled at it's first end to the second end of the base member; wherein a means is provided for releasably coupling the straps to vehicles interior; wherein each strap member is equipped with a strap adjuster buckle which allowed the strap to be wrapped around and attached to a vehicles hand holds, suction cups mounted to the vehicles side windows, and/or other available attachment points.

With specific reference to the following patents:
U.S. Pat. No. 5,544,797; U.S. Pat. No. 3,155,299; U.S. Pat. No. 2,721,680 A; U.S. Pat. No. 4,881,674.

(a) U.S. Pat. No. 5,544,797 discloses a fishing rod carrier for use in a vehicle cab interior for holing fishing rods. In general this invention strives to solve the same problem as the present invention but differs in design and construction. The main difference being that it represents a device with fixed closed loops where "Each carrier member includes a first flexible non-elastomeric elongated strap having first and second ends. A second flexible elastomeric elongated strap is coupled to the first strap at selected locations but otherwise uncoupled to the first strap, and forms a plurality of elastomeric loops along the length of the first strap. Each loop defines a clearance of preselected dimensions between the first and second straps."

The present invention is not comprised of a single length of material creating fixed loops, it is comprised of individual lengths of shock cord that are coupled at one end and releasably coupled at the other end using a keyhole cutout in it's base allowing the shock cord to be wrapped around the fishing rod where it compresses the rod against the base member in order to hold it securely. The cited art does not.

(b) U.S. Pat. No. 3,155,299 A represents another rack for fishing rods, the general object of the invention being to provide a permanent means for holding fishing rod with a vehicle's interior. And again this invention strives to solve the same problem as the present invention but differs in design and construction. It's base means is made up of ridged materials, screwed to and permanently affixed to the roof of a vehicles interior. It's front carrier member uses hooks to secure the fishing rods. Its rear carrier member is made of a ridged base with fixed loops for holding rods.

The present invention is not comprised of ridged materials, hooks or fixed loops; again it is comprised of individual lengths of shock cord that are coupled at one end and releasably coupled at the other end using a keyhole cutout in it's base allowing the shock cord to be wrapped around the fishing rod where it compresses the rod against the base member in order to hold it securely. The cited art does not.

(c) U.S. Pat. No. 2,721,680 A again represents a fishing rod rack for use in a vehicles interior; it strives to solve the same general problem as the present invention but differs in design and construction. The main difference being that it represents a device that attached a vehicles seats. It's ridged in construction, uses clips to hold the front sections of rods, and holes in boards where the rod handles are secured. It lacks the same construction as the present invention.

(d) U.S. Pat. No. 4,881,674 A represents another rack for fishing rods, the general object of the invention being to provide a permanent means for holding fishing rod with a camper shell or a vehicle's interior. Again this invention strives to solve the same problem as the present invention but differs in design and construction. It's base means is made up of ridged materials, screwed to and permanently affixed to the roof of a camper shell or vehicles interior. Its carrier means are comprised "A generally rectangular first support has a plurality of U-shaped notches for the reception of handle portions of a plurality of fishing rods. A pivotal clamp bar is mounted between pairs of adjacent notches and may be pivoted between opened and closed positions for securing a fishing rod handle within each notch. A plurality of spaced apertures are provided for the reception of threaded fasteners utilized to secure the first support to a roof cross brace of the camper shell". Again this device lacks any of the same construction as the present invention. The present invention is comprised of individual lengths of shock cord that are coupled at one end and releasably coupled at the other end using a keyhole cutout in it's base member allowing the shock cord to be wrapped around the fishing rod where it compresses the rod against the base member in order to hold it securely. The cited art does not.

While the devices disclosed in the background art appear adequate for the purposes for which they have been specifically designed, they fail to provide a fishing rod carrier that allows rods to be easily and wholly secured to the rack, while the rack remains easily installable and removable. As a result of the shortcomings of the background art, there exists a need for a new and improved fishing rod carrier.

OBJECTS AND ADVANTAGES

In keeping with the principle of the present invention the fishing rod carrier for vehicle interiors is unique and technically different from other forms of car rod racks.

The Fishing rod carrier is uncomplicated in design, ergonomic, and easy to use. It's easily installed, easily removed, and rolls up for storage. Fishing rods are highly accessible and are held securely and protected from damage. It's construct of materials that can stand up to the rigors of motoring and fishing and is easily maintained.

The carrier is used in a vehicle cab interior and holds a plurality of fishing rods; it includes first and second carrier members. The carrier members are mostly comprised of two elongated support members in the form of straps, which are comprised of a main section with webbing attached at both ends. The carriers have individual fishing rod support members and a means of attaching the carriers to a vehicles interior. The carriers run across the width of the vehicle near the roof and are spaced one forward in the cab and one towards the rear. The carriers are stretched across the width of the vehicle and can be attached to the vehicle using the vehicles existing upper hand holds (handles), utility supports or by using suction cup devices attached to the insides of the windows. Fishing rods are releasably held by individual lengths of shock (bungee) cord spaced along the length of the center section of each carrier. Each length of shock cord is indexed at intervals, allowing a space for rods to be secured. One end of each length of shock cord is secured to the strap, while the loose (tag) end wraps around the rod and passes back through a keyhole shaped hole in the strap where it is releasably secured by being pinched in the narrow slot of the keyhole. This configuration allows for the shock cord to be pulled tight against the rods, holding rods securely between the strap and shock cord; it also makes this device adjustable to any sized rod or their handles. The tag end of the shock cords can also be secured, using the keyhole, so they form open loops where rods can be inserted and held if desired. The webbing at both ends of the strap are used to attach the carriers to the vehicle, each strap member is equipped with a strap adjuster buckle which allowed the strap to be wrapped around and attached to a vehicles hand holds, suction cups mounted to the vehicles side windows, and/or other available attachment points.

The present device is constructed to hold fishing rods securely either full length or when broken down into sections. The ability to hold full-length rods is a real advantage when one moves to from one fishing ground to another without having to disassemble the rod. Having the ability to keep rods stored inside a vehicle when stopping in public places is also advantages in regards to security.

Therefore the primary objective of the present invention is to provide an apparatus for use by anglers that holds fishing rods securely and protected while remaining highly accessible.

The rod retention apparatus is generally formed of two carrier members. Each carrier member having a base member comprised of a flat piece of elongated material having two faces and first and second ends; the base members including alterating pairs of one round shaped and one keyhole shaped cutouts which are located in the face of the base member and indexed along the longitudinal center line of the base members; the base members is further comprised of adjustable and tensionable individual portions of flexible elastomeric elongated cord (shock cord), having first and second ends and having one piece of shock cord per pair of cutouts; wherein each portion of shock cord is affixed at it's first end through one of the holes in the base member and where it's second end is releasably affixed to the base member by being passed through the keyhole shaped cutout where it is drawn into a slot within the cutout where it is held in a desired position by means of compression upon the shock cord from opposing sides of the cutout. The base members including two flexible elongated straps, in the form of webbing, used to attach the carriers to the vehicle, one coupled at it's first end to the first end of the base member and one coupled at it's first end to the second end of the base member where the end straps aren't formed from the base material itself; wherein each strap member is equipped with a strap adjuster buckle which allowed the strap to be wrapped around and attached to a vehicles hand holds, it's utility attachment points, or suction cups mounted to the inside of the vehicles side windows.

Accordingly, there is a need to provide an improved fishing rod carrier for anglers.

SUMMARY

It is therefore an object of the present invention is to provide a improved, simple, and ergonomic fishing rod carrier for holding one or more fishing rods within an vehicle.

Another object of the present invention is to provide a fishing rod carrier that is highly adaptable and adjustable so that it can be conveniently positioned within a multitude the most common station wagons, SUV's, hatchbacks and truck bed canopies.

Another object of the present invention is to provide a fishing rod carrier that is easily stored when not in use.

Another object of the present invention is to provide a fishing rod carrier what easily accepts fishing rods with their fishing reels attached.

Another object of the present invention is to provide a fishing rod carrier that doesn't use fixed loops for securing rods.

Another object of the present invention is to provide a fishing rod carrier that holds fishing rods securely and protected from loss or damage.

In accordance with the above and the other objects of the present invention, which will be discussed in detail below, a fishing rod carrier is provided.

In the following embodiments the primary sections are interchangeable creating a new embodiment.

According to a first embodiment of the invention, the fishing rod carrier is formed of two carrier members, each carrier member comprising a generally elongated base member having a first and second face and first and second ends, and is comprised of semi flexible and durable materials. The base member has pairs of alternating one generally round shaped and one generally keyhole shaped cutouts located through the faces of the base member, the round and keyhole shaped cutouts are indexed along the longitudinal center line of the base members. A rod retention means is provided within the space between round shaped cutouts and keyhole shaped cutouts of each pair. The rod retention means comprises of individual portions of flexible elastomeric elongated cord (shock cord) having first and second ends; one portion of shock cord per pair of cutouts. The shock cord is held captive to its carrier member by being enlarged at each of its ends so as to be prevented from passing through the generally round cutout wherein the shock cord is held in a desired position by means of compression upon the shock cord from opposing sides of the slot portion of the keyhole cutout. The shock cord is releasably affixed to the base member by one end of the shock cord being passed through the large section of the keyhole shaped cutout where it is inserted into the keyhole slot within the keyhole shaped cutout. A section of fishing rod, or sections of fishing rods are held securely in place by being compressed between the base member and the shock cord. A section of fishing rod is placed against the base member in the area between the round cutout and said keyhole cutout. The second end of the shock cord is placed around the rod section then inserted into the corresponding keyhole cutout where it is pulled into the keyhole slot; the shock cord is tensioned and held a desired position around the fishing rod securing it.

In this embodiment the base members have two flexible elongated straps, in the form of webbing, used to attach the carriers to the vehicle, one coupled at it's first end to the first end of the base member and one coupled at it's first end to the second end of the base member where the end straps aren't formed from the base material itself; wherein each strap member is equipped with a strap adjuster buckle which allowed the strap to be wrapped around and attached to a vehicles hand holds, it's utility attachment points, or suction cups mounted to the inside of the vehicles side windows. In this embodiment the carrier closest to the front windscreen is attached to the vehicles overhead hand holds my means of looping the strap ends around the handle; while the rear carrier is attached to the inside of the vehicles rear side windows using the end straps attached to reuseable suction cups.

According to a second embodiment of the invention, the fishing rod carrier is again formed of two carrier members, where the base of each carrier member is made from a single piece of elongated strap made of webbing; the ends of the base members are lengthened and used for attaching the carrier to the vehicle. As with the first embodiment the base member has pairs of alternating one generally round shaped and one generally keyhole shaped cutouts located through the faces of the base member, the round and keyhole shaped cutouts are indexed along the longitudinal centerline of the base members. In this embodiment both round and keyhole shaped cutouts are further formed from metal eyelets. Again a rod retention means is provided within the space between round shaped eyelets and keyhole shaped eyelets of each pair. The rod retention means comprising of individual portions of flexible elastomeric elongated cord (shock cord) having first and second ends; one portion of shock cord per pair of said cutouts. The shock cord is held captive to its carrier member by being enlarged at its each of its ends so as to be prevented from passing through the generally round eyelet. The shock cord is releasably affixed to the base member by one end of the shock cord being passed through the large section of the keyhole shaped eyelet where it is pulled into the keyhole slot within the keyhole shaped eyelet where it is held in a desired position by means of compression upon the shock cord from opposing sides of the slot portion of the keyhole shaped eyelet. A section of fishing rod, or sections of fishing rods are held securely in place by being compressed between the base member and the shock cord; a section of fishing rod is placed against the base member in the area between the round eyelet and keyhole shaped eyelet. The second end of the shock cord is placed around the rod section then inserted into the corresponding keyhole shaped eyelet and pulled into the keyhole slot within the eyelet; the shock cord is tensioned and held a desired position around the fishing rod securing it.

In this embodiment the ends of the base are lengthened and used to attach the carriers to the vehicle. The ends of each carrier is equipped with a strap adjuster buckle which allowed the strap to be wrapped around and attached to a vehicles hand holds, it's utility attachment points, or suction cups mounted to the inside of the vehicles side windows. In this embodiment both carriers are attached to the vehicles overhead hand holds my means of looping the strap ends around the handle.

According to a third embodiment of the invention, the shock cord ends are terminated with plastic end-caps.

According to a forth embodiment of the invention, the two carriers comprise patches of deformable and cushioned material affixed to the carriers where fishing rods come in contact with the carriers.

Other objects and advantages of the present invention will become apparent to those skilled in the art upon reference to the following detailed description and appended claims, and upon reference to the accompanying drawings.

Other objects and advantages of the present invention will become apparent to those skilled in the art upon reference to the following detailed description and appended claims, and upon reference to the accompanying drawings.

DRAWINGS—FIGURES

In the drawings, closely related figures have the same number but different alphabetic suffixes.

The terms "keyhole shaped", "keyhole shaped cutout" and keyhole shaped eyelet" as used in this specification are intended to mean an enlarged area portion that the flexible elastomeric elongated cord (shock cord) can freely pass through without being compressed and an adjacent reduced area portion that the cord cannot pass through without being compressed. The term "keyhole slot" as used in this specification is intended to mean the portion of the "keyhole shaped cutout" and keyhole shaped eyelet" that is the reduced area portion that the shock cord cannot pass through without being compressed.

FIG. 1 is an elevation view, partly broken away, illustrating the fishing rod carrier mounted inside a vehicle.

FIG. 2 is a perspective view of a preferred embodiment of the invention; the vehicle is partly broken away, illustrating the general shape of the carriers and how it holds two fishing rods. Further illustrating the shock cords, some are attached at one end and ready to receive rods, some are around two fishing rods and some with attached at both ends. The forward most carrier is attached to the vehicles grab bars, the rear carrier is attached to the vehicles side widows using suction cups.

FIG. 5 is a plan view, partly broken away, of the base member illustrating the round and keyhole shaped cutouts as well as the slot within the Keyhole shaped cutout where the shock cord is pinched/compressed between two sides of the slot.

FIG. 6 is a plan view, partly broken away, of the base member illustrating the round and keyhole shaped cutouts formed from metal or plastic eyelets.

FIG. 7A is a plan view of a keyhole shaped eyelet.

FIG. 7B a bottom perspective view of a keyhole shaped eyelet.

FIG. 7C a top perspective view of a keyhole shaped eyelet.

Figure 8:
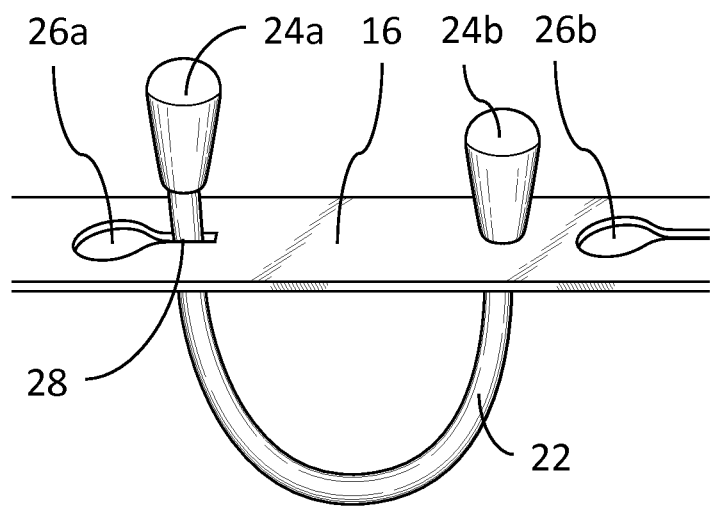

FIG. 8 is a perspective view, partly broken away, of the base member illustrating the shock cord affixed at one end through a round cutout in the base member and the other end being releasably secured by being compressed/pinched within the Keyhole cutout slot. Further illustrating shock cord end caps.

Figure 9:
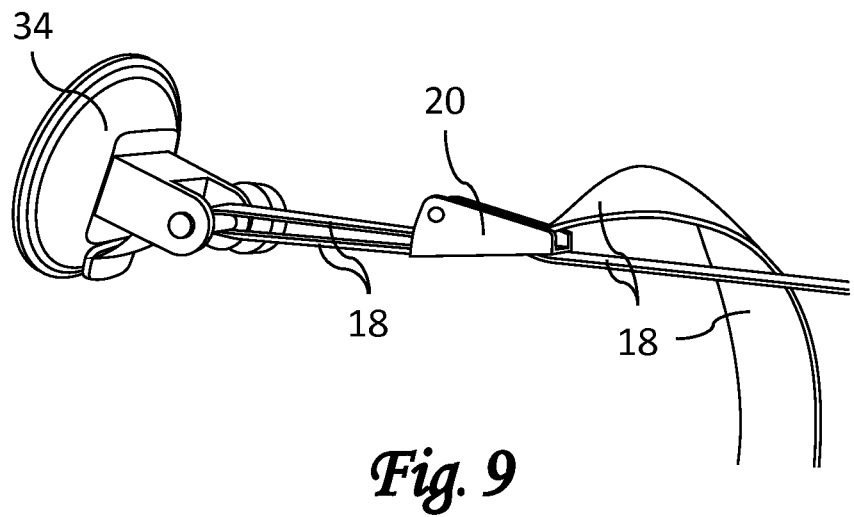

FIG. 9 is a perspective view of the invention, partly broken away, illustrating a rear carrier attached to a vehicles side widow using a suction cup. Further illustrating the adjustable strap buckle.

Figure 10:
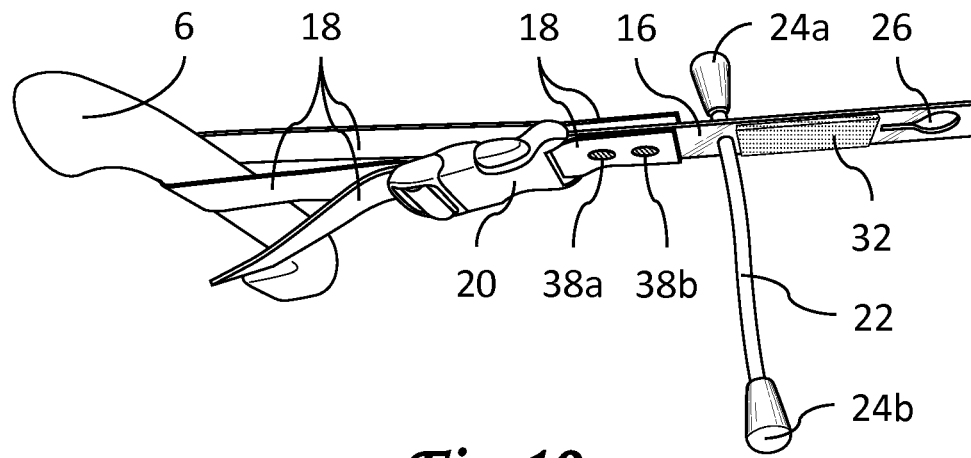

FIG. 10 is a perspective view of the invention, partly broken away, illustrating the forward carrier attached to a vehicles side grab bar. Further illustrating where the webbing and base member are coupled together, along with two rivets (fasteners) that couple the two parts together. This view further illustrates the general shock cord and cushioned material layout along with the adjustable strap buckle attached the webbing.

Figures 11A, 11B:
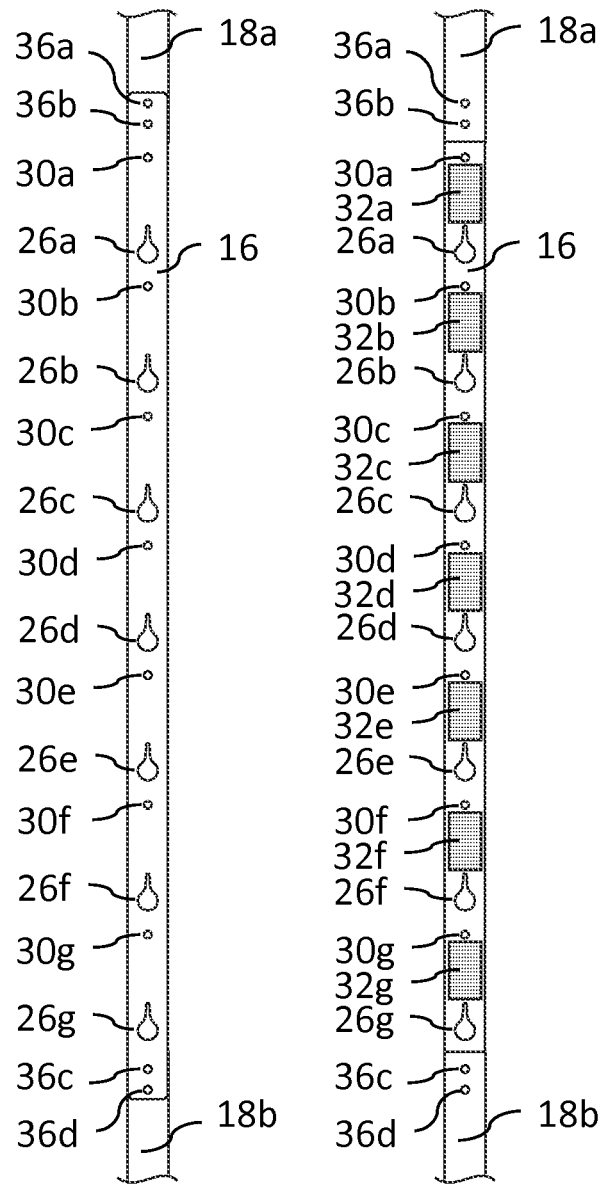

FIG. 11A is a plan view of one carrier member, partly broken away, illustrating the general layout of the base member with webbing attached to both ends.

FIG. 11B is a plan view of one carrier member, partly broken away, illustrating the general layout of the base member with webbing attached to both ends; further illustrating the location of patches of cushioned and deformable materials affixed to the base member.

Figure 12A:
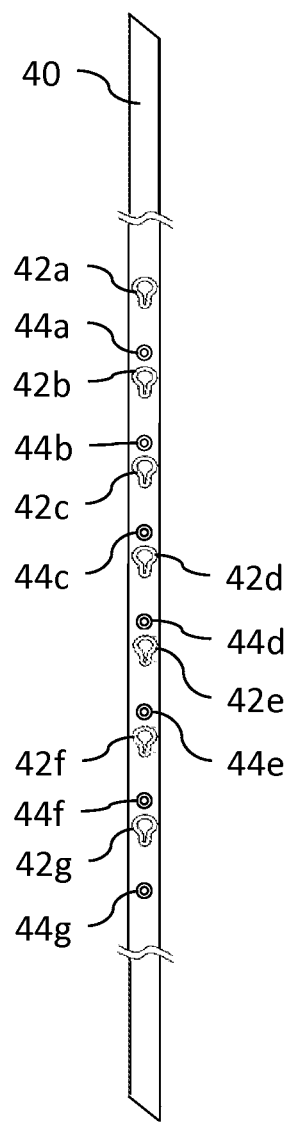

FIG. 12A is a plan view, partly broken away, of another embodiment of the invention illustrating a variation of a carrier member where the carrier members are made from a single piece of flexible material; in this embodiment the base member and end straps are formed from the same piece of material, the ends of the base member are simply lengthened at the ends. Further illustrating the generally round and keyhole shaped cutouts with eyelets.

Figure 12B:
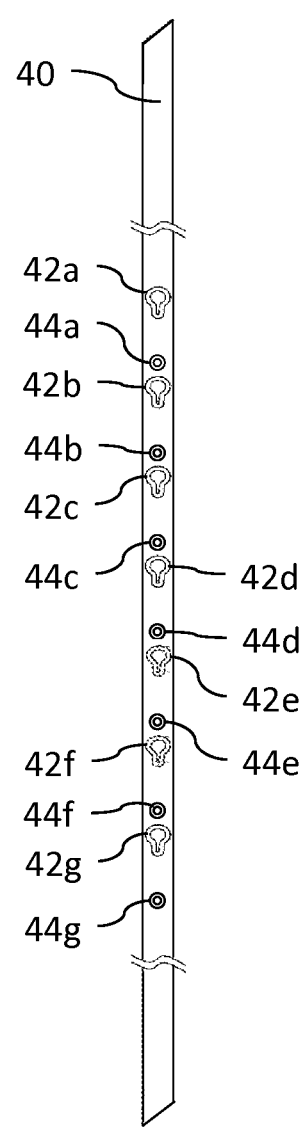

FIG. 12B is a plan view, partly broken away of the reverse side of FIG. 12A.

DRAWINGS—REFERENCE NUMERALS 2 vehicle
4 vehicle side window
6 vehicle handle
8 fishing rod
10 fishing reel
12 front carrier
14 rear carrier
16 base member
18 webbing
20 buckle
22 shock cord
24 shock cord end cap
26 keyhole shaped cutout
28 keyhole slot
30 round cutout
32 cushioned a deformable material
34 suction cup mount
36 fastener hole
38 rivet
40 one-piece carrier made of webbing 42 keyhole shaped eyelet
44 round eyelet

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 1:
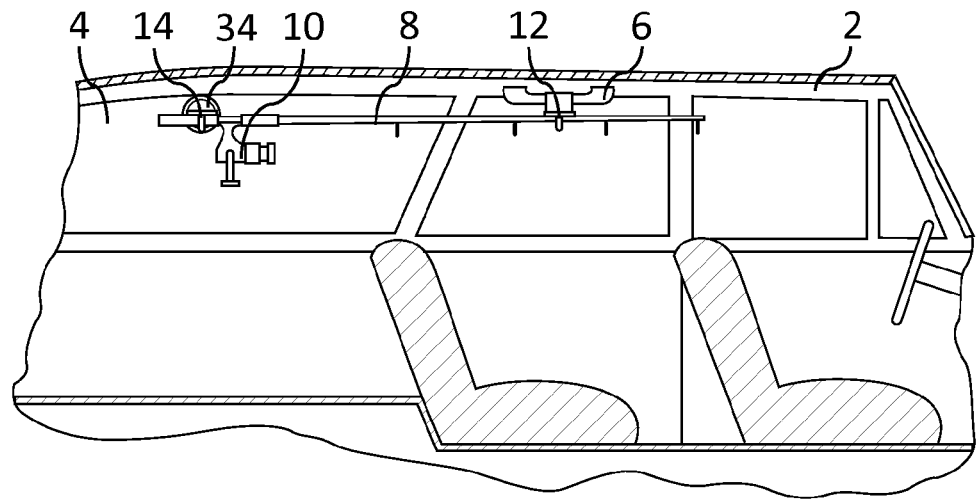

With reference to the drawings, in general, and to FIG. 1 in particular, the general positioning of the multi-featured fishing rod carrier #12 and #14 holding a fishing rod #8 with a fishing reel attached #10, mounted within a vehicle #2 is depicted.

Figure 2:
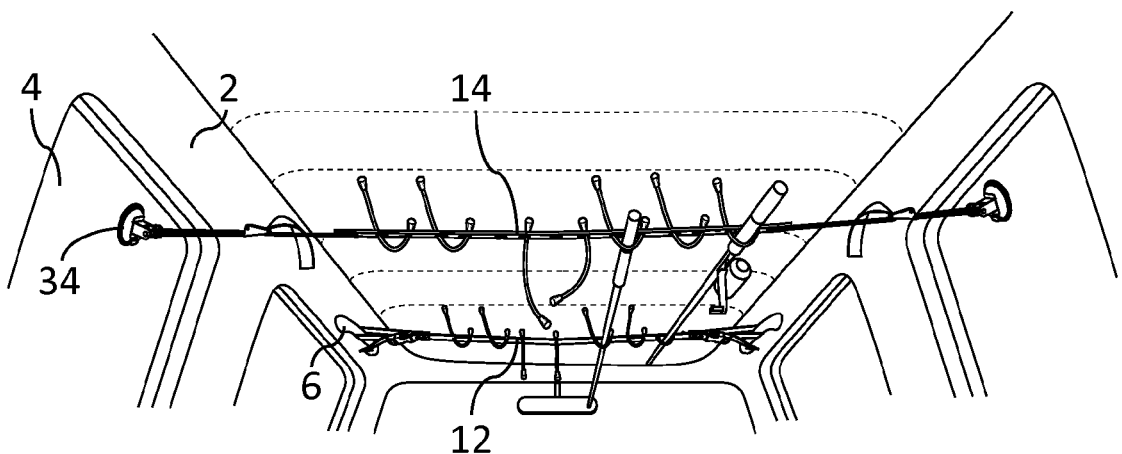

FIG. 2 a perspective bottom view of the fishing rod carrier #12 and #14 embodying the principles of the present invention is generally depicted. The present invention is shown attached to a vehicles interior #2; the front carrier #12 is attached to the vehicle handle #6 and the rear carrier #14 is attached to the vehicles side windows #4 using suction cup mounts #34.

Figure 3:
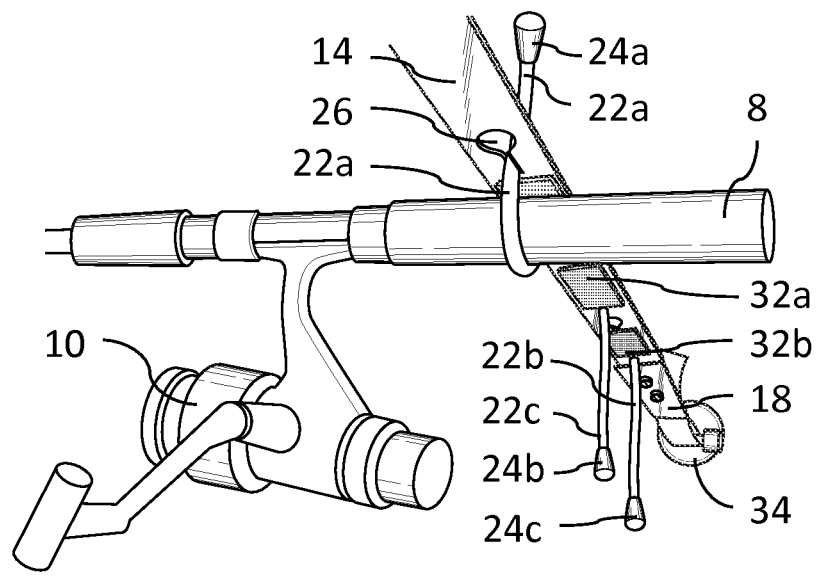
FIG. 3 is a perspective view, partly broken away, of the carrier illustrating a fishing rod handle being secured in the carrier by one of the shock cords and further illustrating how the shock cord is pinched within the keyhole cutout slot. The positioning of the deformable and cushioned material is illustrated.

FIG. 3 a perspective bottom view, partly broken away, of a fishing rod #8 with fishing reel #10 secured in the rear carrier #14; the fishing rod #8 handle is secured between a cushioned pad #32 that is attached to one face of the carrier #14 member and the shock cord #22. The shock cord #22a holding the fishing rod #8 is shown tensioned against the fishing rod #8; the releasably held shock cord #22 end which is holding the fishing rod #8 is positioned within the keyhole slot #28 which is located within the keyhole shaped cutout #26. Two other shock cords #22b and #22c are shown in their open positions; all shock cords #22a, b, c are shown with end caps #24a, b, c. Illustrating the rear carrier #14 with webbing #18 attached to a suction-cup mount #34 to attach the rear carrier #14 to a vehicle.

Figure 4:
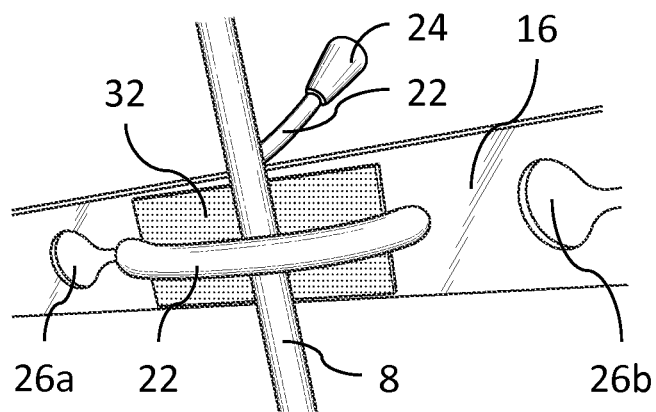
FIG. 4 is a perspective view, partly broken away, further illustrating the general shock cord and keyhole cutout layout. Further illustrating and a portion of fishing rod secured between the shock cord and an area of deformable and cushioned material that is attached to the base member.

FIG. 4 a perspective bottom view, partly broken away, of a fishing rod #8 secured in a base member #16; the fishing rod #8 is secured between a cushioned pad #32 that is attached to one face of the base member #16 and the shock cord #22. The shock cord #22 holding the fishing rod #8 is shown tensioned against the fishing rod #8; the releasably held shock cord #22 end is holding the fishing rod #8 is positioned within the keyhole shaped cutout #26. The shock cord #22 is shown with an end cap #24.

FIG. 5 a top plan view, partly broken away, of the base member #16, showing in detail the general shapes and general layout of the keyhole shaped cutout #26, keyhole slot #28, and the round cutout #30.

FIG. 6 a top plan view, partly broken away, of one-piece carrier made of webbing #40, showing in detail the general shapes and general layout of the keyhole shaped cutout #26, keyhole slot #28, the round cutout #30, further illustrating the keyhole shaped eyelet #42 and the round eyelet #44.

FIG. 7A is a top plan view illustrating the keyhole shaped eyelet #42.

FIG. 7B a perspective bottom view further illustrating the keyhole shaped eyelet #42.

FIG. 7C a perspective top view further illustrating the keyhole shaped eyelet #42.

FIG. 8 a perspective front view, partly broken away, of the base member #16, keyhole shaped cutout #26 and shock cord #22; depicting in detail how the first end of the shock cord #22 is affixed to the base member #16 through the round cutout #30 and the second end of the shock cord #22 is being secured within the keyhole slot #28 by compression upon the shock cord #22 by two sides of the keyhole slot #28. Further illustrating the second end of the shock cord #22, in this embodiment with shock cord end cap #24a, having been passed through the keyhole cutout #26 then drawn into the keyhole slot #28 to releasably secure the shock cord #22 within the base member #16.

FIG. 9 a perspective front view, partly broken away, in one preferred embodiment showing how the rear carrier #14 is attached to a suction cup mount #34; the webbing #18 pass through the adjustable buckle #20 is then looped around a portion of the suction cup mount #34 and passed back through the adjustable buckle #20.

FIG. 10 a perspective front view, partly broken away, in one preferred embodiment showing how the front carrier #12 is attached to a vehicle handle #6; the webbing #18 pass through the adjustable buckle #20 is then looped around a the vehicle handle #6 and passed back through the adjustable buckle #20. FIG. #8 further depicting how the webbing #18 is coupled to the base member #16 using two rivets #38a and #38b; further detailing the layout of the shock cord #22 with shock cord end caps #24a and #24b, cushioned pad #32 and keyhole shaped cutout #26.

FIG. 11A is a top plan view, partly broken away, of one face of the base member #16, showing in detail the general shapes and general layout of the keyhole cutouts #26a, b, c, d, e, f, g and the round cutout #30a, b, c, d, e, f, g; further depicting the webbing #18a and #18b attached to both end of the base member #16 and the fastener holes #36a, b, c, d, that are use to couple the webbing #18a and #18b to the base member #16.

FIG. 11B a bottom plan view, partly broken away, of the second face of the base member #16, further illustrating in the general shapes and general layout of the cushioned a deformable material #32a, b, c, d, e, f, g.

FIG. 12A is a top plan view, partly broken away, of another embodiment of the invention showing a one-piece carrier made of webbing #40; depicting how the carrier member is made from a single piece of material, the ends of the base member are simply lengthened at both ends. Further illustrating the keyhole shaped eyelets #42a, b, c, d, e, f, g; and the round eyelets #44a, b, c, d, e, f, g.

FIG. 12B a bottom plan view, partly broken away, of the second face of the one-piece carrier made of webbing #40.

One or more of the various advantageous features of the present invention may be incorporated into the terminal tackle holder for beneficial results. These features provide benefit individually as well as collectively to produce a fishing rod carrier.

The foregoing description should be considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod carrier for securing fishing rods a vehicle, comprising:
    a first carrier member that is mountable on a vehicle interior, said first carrier member is configured to be mounted across the width of the vehicle; the first carrier member comprising:
    (a) a generally elongated base member comprised of durable materials and having first and second faces and first and second ends;

(b) pairs of alternating generally round shaped and generally keyhole shaped cutouts located through the faces of the said base member, wherein the said round and keyhole shaped cutouts are indexed along the longitudinal center line of the base members; and (c) a rod retention means provided within each space between said round shaped cutouts and keyhole shaped cutouts of each pair; said rod retention means comprising individual portions of flexible elastomeric elongated cord having first and second ends; wherein:

each keyhole shaped cutout is comprised of an enlarged area portion that a portion of cord can freely pass through without being compressed and an adjacent reduced area portion that the portion of cord cannot pass through without being compressed;

one portion of cord is provided with each pair of said cutouts;

each portion of cord is held captive to base member by being enlarged at each of its ends so as to be prevented from passing through the generally round cutout;

each portion of cord is releasably affixed to the base member by one end of the portion of cord being passed through the said keyhole shaped cutout where it is inserted into the slot within the said keyhole shaped cutout;

each portion of cord is held in a desired position by means of compression of the respective portion of cord from opposing sides of the slot portion of the respective keyhole shaped cutout; and the rod carrier is configured such that a section of fishing rod is held securely in the carrier when the section of fishing rod is placed against the base member an area between one of round cutouts and one of the keyhole cutouts, the second end of a respective portion of cord is placed around the rod section then inserted into the corresponding keyhole cutout and keyhole slot; and the portion of cord is tensioned and held a desired position around the fishing rod.

2. The rod carrier as claimed in claim 1, wherein the base member further comprises resilient cushioned material having a first face and second face, said first face being statically affixed to one or both faces of first base member within a space between the said round shaped cutouts and keyhole shaped cutouts of each pair; such that the said second face of the cushioned material comes in contact with the fishing rod helping to secure it.

3. The rod carrier as claimed in claim 1, wherein the base member includes two flexible elongated straps having first and second faces and first and second ends, said first end of one strap being statically affixed to the first end of the base member, said first end of the other strap being statically affixed to the said second end of the base member; the elongated straps used as attachment means in securing the rod carrier to the vehicle.

4. The rod carrier as claimed in claim 1, wherein the first and second ends of the base member are lengthened and extend outwards from an area of the rod retention means and comprising attachment means to secure said rod carrier to the vehicle; such that the base material of the first carrier member is formed from a single portion of material.

5. The rod carrier as claimed in claim 1, wherein the base member is further formed of webbing.

6. The rod carrier as claimed in claim 1, wherein the generally round and said generally keyhole shaped cutouts are further formed from eyelets.

7. The rod carrier as claimed in claim 1, further comprising suction cup devices are attached to the first and second ends of the base member; such that the said suction cup devices can be used as attachment means in securing the said carriers to the vehicle windows.

8. The rod carrier as claimed in claim 1, further comprising buckles attached to the said carrier member; such that the ends of the base member can be secured around vehicle passenger handholds, vehicle utility attachment points, or said suction cup devices.

9. The rod carrier as claimed in claim 1, wherein strap adjustment buckles are further attached to the said carrier members; such that the ends of the said carrier members can be adjusted to secured the carrier ends around vehicle passenger handholds, vehicle utility attachment points and said suction cup devices.

10. The rod carrier as claimed in claim 1, wherein the said carrier is capable of receiving rods of different sizes and shapes.

11. The rod carrier as claimed in claim 1, wherein the said base member is made of rigid materials.

12. The rod carrier as claimed in claim 1, wherein the said base member is made of flexible materials.

13. The rod carrier as claimed in claim 1, further comprising a second carrier member having the same structure as the first carrier member; wherein the first and second carrier members are capable of being mounted in parallel across the width of a vehicle.

* * * * *